United States Patent
Muller et al.

(10) Patent No.: US 8,689,114 B2
(45) Date of Patent: Apr. 1, 2014

(54) ACTIVITY OBJECTIFICATION FOR NON-ACTIVITY OBJECTS IN AN ACTIVITY-CENTRIC COLLABORATION

(75) Inventors: Michael Muller, Medford, MA (US); Miguel A. Estrada, Hollis, NH (US); Thomas P. Moran, Palo Alto, CA (US); Andrew L. Schirmer, Andover, MA (US); Werner Geyer, Cambridge, MA (US); Suzanne O. Minassian, Boston, MA (US); Michael Chi Hung Wu, Vancouver, CA (US)

(73) Assignee: International Business Machines Corporation, Armonk, NY (US)

( * ) Notice: Subject to any disclaimer, the term of this patent is extended or adjusted under 35 U.S.C. 154(b) by 1441 days.

(21) Appl. No.: 11/608,326

(22) Filed: Dec. 8, 2006

(65) Prior Publication Data
US 2008/0141144 A1 Jun. 12, 2008

(51) Int. Cl.
*G06F 3/00* (2006.01)
(52) U.S. Cl.
USPC ............................................ 715/751; 715/733
(58) Field of Classification Search
USPC ................................................. 715/751, 733
See application file for complete search history.

(56) References Cited

U.S. PATENT DOCUMENTS

| | | | |
|---|---|---|---|
| 6,425,016 B1 * | 7/2002 | Banavar et al. | 719/310 |
| 2003/0078821 A1 * | 4/2003 | Gorur et al. | 705/7 |
| 2005/0165859 A1 * | 7/2005 | Geyer et al. | 707/201 |

* cited by examiner

*Primary Examiner* — Andrea Leggett
(74) *Attorney, Agent, or Firm* — Steven Greenberg, Esq.; CRGO Law

(57) ABSTRACT

Embodiments of the present invention address deficiencies of the art in respect to activity thread management and provide a method, system and computer program product for activity objectification for non-activity objects in an activity-centric collaboration tool. In an embodiment of the invention, a method for activity objectifying non-activity/task objects in an activity-centric collaboration tool can be provided. The method can include selecting a non-activity/task object in an activity thread for an activity map of the activity-centric collaboration tool, and associating an activity attribute with the selected non-activity/task object. The non-activity/task object further can be decorated with a user interface control corresponding to a value for the activity attribute, and a state for the user interface control can be changed responsive to changes in the value for the activity attribute.

19 Claims, 3 Drawing Sheets

ACTIVITY OBJECTIFICATION FOR NON-ACTIVITY OBJECTS IN AN ACTIVITY-CENTRIC COLLABORATION

BACKGROUND OF THE INVENTION

1. Field of the Invention

The present invention relates to the field of collaborative computing and more particularly to activity-centric collaborative computing.

2. Description of the Related Art

Collaborative computing refers to the use by two or more end users of a computing application in order to achieve a common goal. Initially envisioned as a document sharing technology among members of a small workgroup in the corporate environment, collaborative computing has grown today to include a wide variety of technologies arranged strategically to facilitate collaboration among groups as small as two people, or as large as a world-wide community. Thus, different collaborative applications may focus at groups of different sizes. No longer merely restricted to document sharing, the modern collaborative environment can include document libraries, chat rooms, video conferencing, application sharing, and discussion forums to name only a few.

A collaborative computing application enjoys substantial advantages over a more conventional, individualized computing application. Specifically, at present it is rare that a goal of any importance is entrusted and reliant upon a single person. In fact, many goals and objectives can be achieved only through the participation of a multiplicity of individuals, each serving a specified role or roles in the process. Consequently, to provide computing tools designed for use only by one of the individuals in the process can be short sighted and can ignore important potential contributions lying among the other individuals involved in the process.

Personal information managers and project management systems represent two such computing applications which attempt to manage a process leading to an objective, leveraging of the participation of many individuals in the process. Considering first the personal information manager (PIM), in a PIM, a single end user can establish a calendar of events and a to-do list of tasks which are to be performed by the end user. To the extent that a task is to be performed by another individual, the end user only can establish a task reminding the end user to monitor the completion of the task by the other individual. PIMs do permit the calendaring of events among different individuals, but the calendaring operation only can "invite" others to calendar the event within the personal information manager of other users.

Project management systems, by comparison, provide means for an individual or a group to define and track project stages with strictly-specified interdependencies. In a traditional project management system, the phases of a project can be defined from start to finish and a timeline can be generated for the project. Utilizing the timeline, it can be determined when particular phases of the project have been completed and when a subsequently scheduled phase of the project can begin. To the extent that the timing of one phase of the project changes, the remaining project phases can be adjusted to accommodate the changed timing. Similarly, if the project requires the use of limited resources, and the allocation of one such resource changes, the remaining project phases that depend on that resource can be adjusted to accommodate the reduction of that resource. A major strength of project management systems is their maintenance of these kinds of strict interdependencies. In addition, in many project management systems, particular people can be assigned to particular phases of the project.

Notwithstanding the foregoing, individualized PIMs and project management systems do not account for the actual nature of a coordinated set of collaborative tasks conducted by people, such as an activity. An activity, unlike a typical project or workflow, refers to objects, actions, and persons in the real world, and provides a computerized representation of selected aspects of those objects, actions, and persons. As is well known, human work is notoriously situational and changeable. Humans discover new aspects of problems, develop new understandings of constraints, adapt to changed conditions, and inform their colleagues about these new circumstances.

Regarding this changeable, re-interpretable, shared human work, conventional task management systems have failed to provide a flexible, collaborative computerized representation of a coordinated set of collaborative tasks. Rather, PIMs provide merely flexible, but private representations of collaborative tasks. By comparison, project management systems provide shared representations of project components in which one user typically specifies a fixed set of components and their interdependencies for use by other users. Furthermore, in project management systems, other users are relegated to the task of updating not the interdependencies, but merely the status of the specified components within those strict interdependencies.

Modern collaboration tools address the deficiencies of the PIM and project manager by combining e-mail with other functions to integrate e-mail seamlessly into end user daily activities in an activity-centric collaboration tool. Activity-centric collaboration tools recognize that it is not enough to help people manage their e-mail, but to help people manage their work by associating communications and information feeds around a topic or activity. In an activity-centric collaboration tool, e-mail messages, synchronous communication such as instant messages, screen images, files, folders and to-do lists can be combined into an activity thread by a project team allowing the project team to switch easily between asynchronous and real-time collaboration.

In this regard, an activity thread might include the messages, chats and files exchanged among members of a team participating in a group project. More specifically, an activity object such as a task description can be associated with metadata, which can include for example one or more persons related to that activity, their respective roles such as "assigner" and "assignee," and various dates such as the date-of-assignment, the date-due, the date-actually-completed, and so on.

Despite the advancement of the collaboration tool to include the notion of activity threads, recent field research has shown that, given a choice, users spontaneously choose task/activity objects to represent work only one-fifth of the time, while choosing other object types ("non-activity objects") such as document or chat to represent work eighty percent of the time. Yet, users often attach task/activity meaning to those objects not represented by a task/activity object—especially documents. Accordingly, the paradigm of the activity thread remains lost upon a substantial population of users most in need of the activity paradigm.

BRIEF SUMMARY OF THE INVENTION

Embodiments of the present invention address deficiencies of the art in respect to activity thread management and provide a novel and non-obvious method, system and computer program product for activity objectification for non-activity objects in an activity-centric collaboration tool. In an embodiment of the invention, a method for activity objectifying non-activity/task objects in an activity-centric collaboration tool can be provided. The method can include selecting a non-activity/task object in an activity thread for an activity map of the activity-centric collaboration tool, and associating an activity attribute with the selected non-activity/task object. In one aspect of the embodiment, the non-activity/task object can be decorated with a user interface control corresponding to a value for the activity attribute. Thereafter, a state for the user interface control can change responsive to changes in the value for the activity attribute.

In another embodiment of the invention, an activity-centric collaboration data processing system can be provided. The system can include an activity-centric collaboration tool configured to product an activity map for an activity thread and to manage activity attributes for activity/task objects in the activity thread. The system further can include activity objectification logic. The logic can include program code enabled to associate and manage activity attributes for non-activity/task objects in the activity thread.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for activity objectification of a non-activity object in an activity-centric collaboration tool In accordance with an embodiment of the present invention, activity meta-data can be established for a non-activity object in an activity thread. The activity meta-data can include, for example, the identity of an assigning user, an assigned user and a due date for the non-activity object. Thereafter, the activity meta-data can be linked to the non-activity object and accessed from the non-activity object through a user interface to the activity thread. As part of the access to the activity objectified non-activity object, a status of the non-activity object can be provided. In this way, though work treated as an activity may be represented using a non-activity object, the activity attributes of an activity object can be established and managed in association with the non-activity object.

Figure 1:
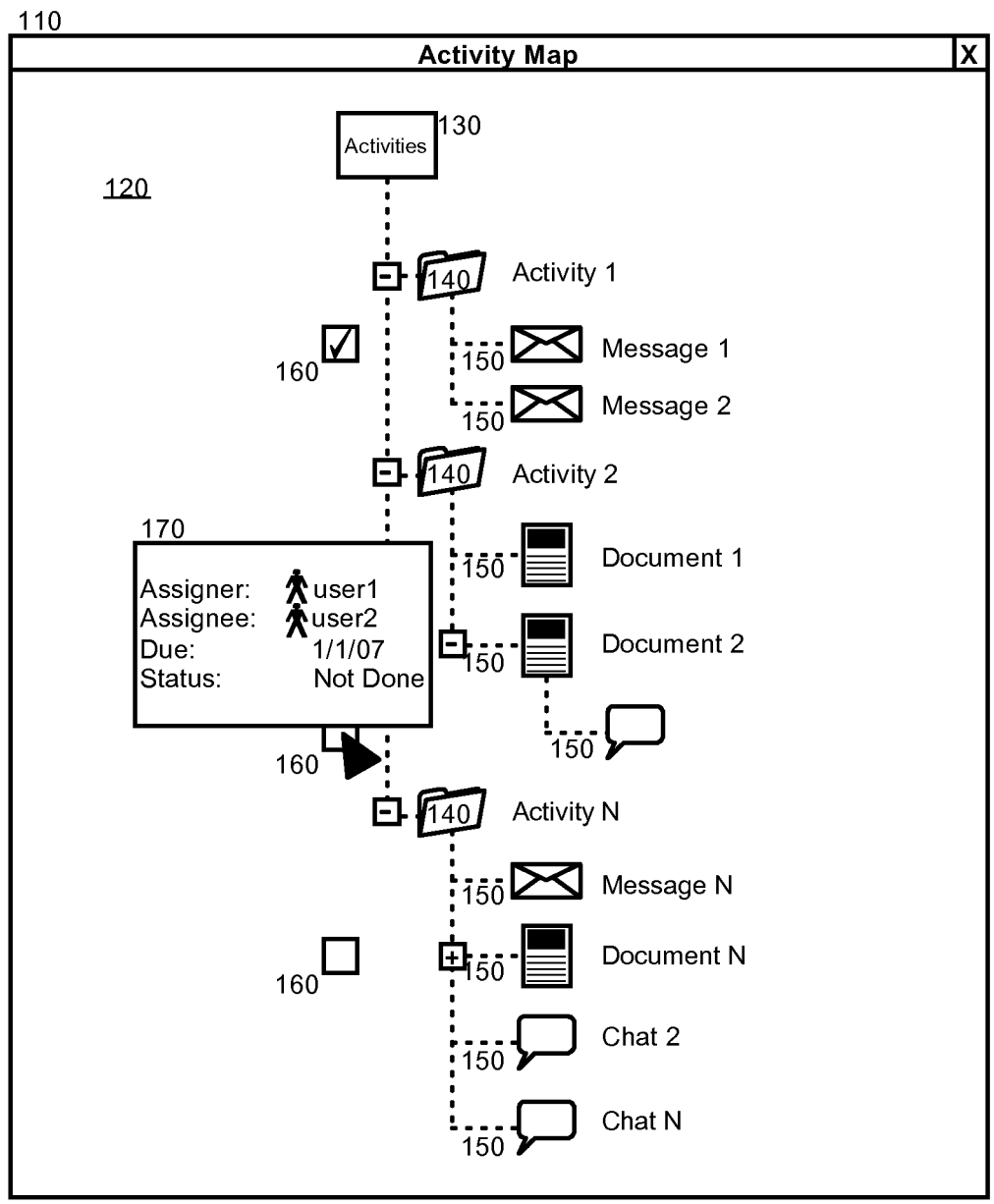
FIG. 1 is an exemplary screen shot activity map configured for activity objectification of non- activity objects in an activity thread of an activity-centric collaboration tool.

In further illustration, FIG. 1 is an exemplary screen shot activity map configured for activity objectification of non-activity objects in an activity thread of an activity-centric collaboration tool. As shown in FIG. 1, an activity map 110 can be provided in a user interface to an activity-centric collaboration tool. The activity map 110 can include a hierarchical display 120 of activities 130 including one or more activity threads 140. Each of the activity threads 140 can include not only activity objects, but also non-activity objects 150 including messages, such as e-mails and instant messages, chats and documents. Non-activity objects 150 can be activity objectified by associating activity-centric meta-data 170 with the non-activity object and an activity status control 160. In this way, non-activity objects 150 used to represent activity concepts can be decorated with suitable activity-centric user interface elements and configured for activity-centric logic.

Figure 2A:
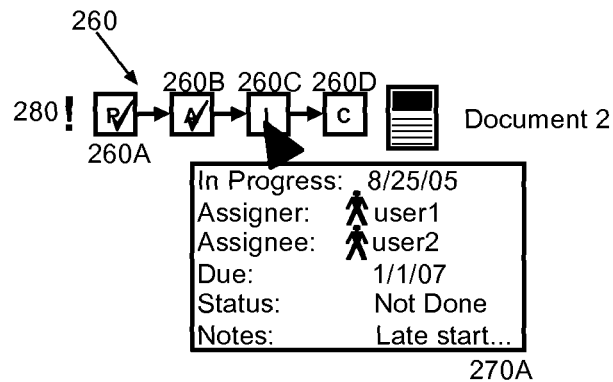
FIGS. 2A through 2C, taken together, are exemplary pictorial illustrations of different activity objectified and decorated non-activity objects in an activity thread of an activity-centric collaboration tool.
Figure 2B:
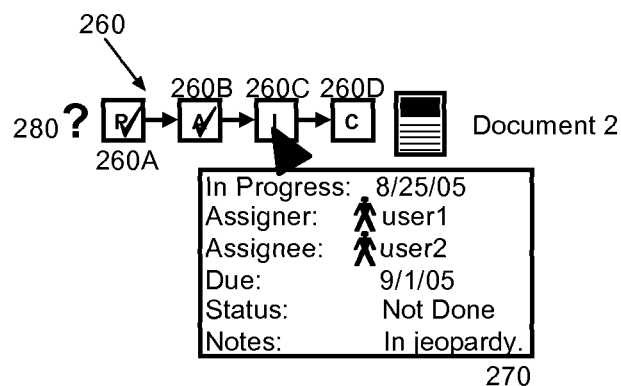
Figure 2C:
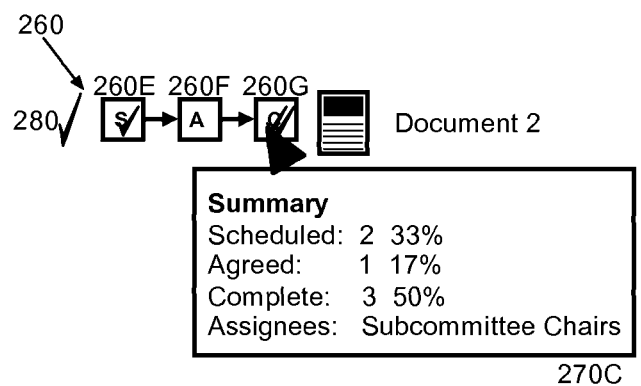

For instance, referring to FIGS. 2A through 2C, different non-activity objects are shown to be activity decorated and objectified. Considering FIGS. 2A through 2C, a non-activity object is shown with an associated activity status control 260. The activity status control 260 can include a series of checkboxes 260A, 260B, 260C, 260D representing different phases of an activity process such as "proposed", "accepted", "in process" and "complete", or "scheduled", "agreed upon" and "complete" to name only two such possibilities. As each different phase of the activity is completed, the checkbox can be selected as shown in FIG. 2A. It is to be recognized, however, that the different phases of the activity process have been associated with a non-activity object—in this case a document.

Optionally, the activity status control 260 can be decorated with an alert status indicator 280. The alert status indicator 280 can provide a visual indication of the state of the entire activity irrespective of a current phase. When it appears that the activity has proceeded according to plan, a nominal indicia can be presented, when it appears that the activity may not proceed according to plan, a questionable indicia can be presented. When it appears that the activity definitely will not proceed according to plan and may not be completed, an alarm indicia can be presented. In all cases, an activity meta-data pop-up 270A can be provided.

The activity meta-data pop-up 270A, 270B, 270C can present a selection of activity-centric data metrics for the activity objectified non-activity object. Examples include the user or role assigning the activity, the user or role assigned to the activity, the due date for the activity, the current status of the activity, and any notes pertaining to the activity. Other examples include a percentage and number of users who have scheduled the activity, a percentage and number of users who have agreed to the activity, and a percentage and number of users who have completed the activity. In all, substantial activity meta-data items can be assigned to a non-activity object, tracked for the non-activity object, and presented to the end user within the activity map.

Figure 3:
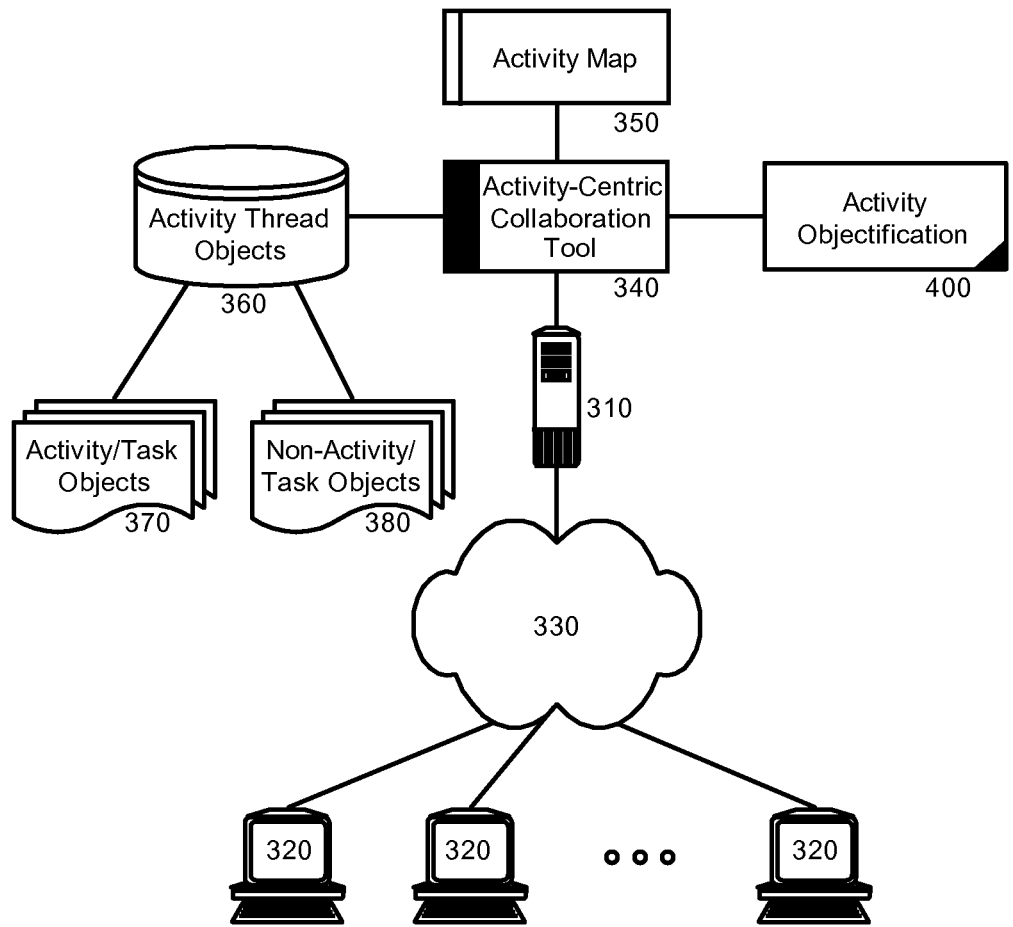
FIG. 3 is a schematic illustration of an activity-centric collaboration system configured for activity objectification of non-activity objects in an activity thread of an activity-centric collaboration tool; and, FIG. 4 is a flow chart illustrating a process for activity objectification of a non-activity object in an activity-centric collaboration tool.

In further illustration, FIG. 3 is a schematic illustration of an activity-centric collaboration system configured for activity objectification of non-activity objects in an activity thread of an activity-centric collaboration tool. The system can include a collaborative host 310 coupled to one or more collaborative clients 320 over a computer communications network 330. The collaborative host 310 can support the operation of an activity-centric collaboration tool 340 for use by collaborative end users through the collaborative clients 320. To facilitate the collaborative interaction between the collaborative end users, a view to an activity map 350 can be provided through the activity-centric collaboration tool 340 such that activity threads involving different groups of collaborative end users can be presented visually in an activity-centric way.

Notably, the activity-centric collaboration tool 340 can manage the arrangement and progression of different activity thread objects 360 for different activity threads presented in the activity map 350. Those different activity thread objects 360 can include not only activity and task objects 370 inherently configured to behave in an activity-centric way, but also non-activity/task objects 380 such as documents, mail messages and chats that are not inherently configured to behave in an activity-centric way. Notwithstanding, activity objectification logic 400 coupled to the activity-centric collaboration tool 340 can include program code enabled to apply activity meta-data for the non-activity/task objects 380 so as to activity objectify the non-activity/task objects 380.

Figure 4:
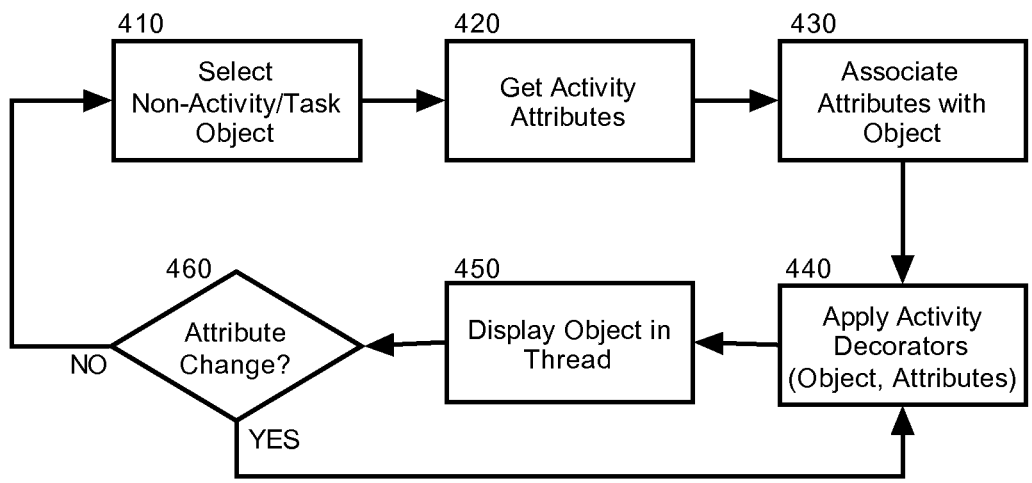

In yet further illustration, FIG. 4 is a flow chart illustrating a process for activity objectification of a non-activity object in an activity-centric collaboration tool. Beginning in block 410, a non-activity/task object can be selected for rendering in an activity thread of an activity map. In block 420, one or more activity attributes can be selected for association with the non-activity/task object and in block 430, the selected attributes can be associated with the non-activity/task object. Thereafter, as shown in block 440, corresponding decorators can be applied to the selected non-activity/task object in a view to the activity thread in the activity map. Finally, the activity objectified non-activity/task object can be displayed in the activity map, as illustrated in block 450. In decision block 460, when a change occurs for any of the attributes for the non-activity/task object, decorators for the new changes to the attributes can be applied in block 440 and the non-activity/task object can be re-displayed.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method, with a computer system comprising a processor and storage device, for activity objectifying non-activity/task objects in an activity-centric collaboration tool, the method comprising:

selecting, from the storage device, a non-activity/task object in an activity thread for an activity map of the activity-centric collaboration tool;

associating, using the processor, an activity attribute with the selected non-activity/task object, comprising associating an alert status attribute with the selected non-activity/task object; and, displaying an alert status indicator based upon the alert status attribute for the selected non-activity/task object in the activity thread, the alert status indicator providing a visual indication of a state of an entire activity and is selected from the group consisting of a nominal indicia, a questionable indicia, and an alarm indicia.

2. The method of claim 1, further comprising:

decorating the non-activity/task object with a user interface control corresponding to a value for the activity attribute; and, changing a state for the user interface control responsive to changes in the value for the activity attribute.

3. The method of claim 1, wherein selecting a non-activity/task object in an activity thread for an activity map of the activity-centric collaboration tool, comprises selecting a non-activity/task object selected from the group consisting of a document object, a message object and chat object, in an activity thread for an activity map of the activity-centric collaboration tool.

4. The method of claim 1, wherein associating an activity attribute with the selected non-activity/task object, comprises associating an activity status attribute with the selected non-activity/task object.

5. The method of claim 4, wherein associating an activity attribute with the selected non-activity/task object, further comprises managing a value for the activity status attribute for the selected non-activity/task object, the value comprising a value selected from the group consisting of "proposed", "accepted", "in progress" and "complete".

6. The method of claim 4, wherein associating an activity attribute with the selected non-activity/task object, further comprises managing a value for the activity status attribute for the selected non-activity/task object, the value comprising a value selected from the group consisting of "scheduled", "agreed" and "complete".

7. The method of claim 1, wherein associating an activity attribute with the selected non-activity/task object, comprises associating activity-centric data metrics with the selected non-activity/task object, the activity-centric data metrics comprising metrics selected from the group consisting of a user or role assigning the selected non-activity/task object, the user or role assigned to the selected non-activity/task object, the due date for the selected non-activity/task object, the current status of the selected non-activity/task object, and any notes pertaining to the selected non-activity/task object.

8. The method of claim 1, wherein associating an activity attribute with the selected non-activity/task object, comprises associating activity-centric data metrics with the selected non-activity/task object, the activity-centric data metrics comprising metrics selected from the group consisting of a percentage and number of users who have scheduled the selected non-activity/task object, a percentage and number of users who have agreed to the selected non-activity/task object, and a percentage and number of users who have completed the selected non-activity/task object.

9. An activity-centric collaboration data processing system comprising:
   a processor;
   an activity-centric collaboration tool, running in the processor, and configured to produce an activity map for an activity thread and to manage activity attributes for activity/task objects in the activity thread; and,
   activity objectification logic comprising program code enabled to associate and manage activity attributes for non-activity/task objects in the activity thread, to associate an alert status attribute with a selected non-activity/task object, and to display an alert status indicator based upon the alert status attribute for the selected non-activity/task object in the activity thread, the alert status indicator providing a visual indication of a state of an entire activity and is selected from the group consisting of a nominal indicia, a questionable indicia, and an alarm indicia.

10. The system of claim 9, wherein the non-activity/task objects comprise objects selected from the group consisting of document objects, message objects and chat objects.

11. The system of claim 9, wherein the activity attributes comprise a value set selected from the group consisting of "proposed", "accepted", "in progress" and "complete" and "scheduled", "agreed" and "complete".

12. A computer program product comprising a non-transitory computer usable storage medium having computer usable program code for activity objectifying non-activity/task objects in an activity-centric collaboration tool, the computer program product including:
   computer usable program code for selecting a non-activity/task object in an activity thread for an activity map of the activity-centric collaboration tool;
   computer usable program code for associating an activity attribute with the selected non-activity/task object, comprising associating an alert status attribute with the selected non-activity/task object; and,
   computer usable program code for displaying an alert status indicator based upon the alert status attribute for the selected non-activity/task object in the activity thread, the alert status indicator providing a visual indication of a state of an entire activity and is selected from the group consisting of a nominal indicia, a questionable indicia, and an alarm indicia.

13. The computer program product of claim 12, further comprising:
   computer usable program code for decorating the non-activity/task object with a user interface control corresponding to a value for the activity attribute; and,
   computer usable program code for changing a state for the user interface control responsive to changes in the value for the activity attribute.

14. The computer program product of claim 12, wherein the computer usable program code for selecting a non-activity/task object in an activity thread for an activity map of the activity-centric collaboration tool, comprises computer usable program code for selecting a non-activity/task object selected from the group consisting of a document object, a message object and chat object, in an activity thread for an activity map of the activity-centric collaboration tool.

15. The computer program product of claim 12, wherein the computer usable program code for associating an activity attribute with the selected non-activity/task object, comprises computer usable program code for associating an activity status attribute with the selected non-activity/task object.

16. The computer program product of claim 15, wherein the computer usable program code for associating an activity attribute with the selected non-activity/task object, further comprises computer usable program code for managing a value for the activity status attribute for the selected non-activity/task object, the value comprising a value selected from the group consisting of "proposed", "accepted", "in progress" and "complete".

17. The computer program product of claim 15, wherein the computer usable program code for associating an activity attribute with the selected non-activity/task object, further comprises computer usable program code for managing a value for the activity status attribute for the selected non-activity/task object, the value comprising a value selected from the group consisting of "scheduled", "agreed" and "complete".

18. The computer program product of claim 12, wherein the computer usable program code for associating an activity attribute with the selected non-activity/task object, comprises computer usable program code for associating activity-centric data metrics with the selected non-activity/task object, the activity-centric data metrics comprising metrics selected from the group consisting of a user or role assigning the selected non-activity/task object, the user or role assigned to the selected non-activity/task object, the due date for the selected non-activity/task object, the current status of the selected non-activity/task object, and any notes pertaining to the selected non-activity/task object.

19. The computer program product of claim 12, wherein the computer usable program code for associating an activity attribute with the selected non-activity/task object, comprises computer usable program code for associating activity-centric data metrics with the selected non-activity/task object, the activity-centric data metrics comprising metrics selected from the group consisting of a percentage and number of users who have scheduled the selected non-activity/task object, a percentage and number of users who have agreed to the selected non-activity/task object, and a percentage and number of users who have completed the selected non-activity/task object.

* * * * *